United States Patent [19]

Gindy

[11] Patent Number: 4,621,533
[45] Date of Patent: Nov. 11, 1986

[54] TACTILE LOAD SENSING TRANSDUCER
[75] Inventor: Sherif S. Gindy, Troy, Mich.
[73] Assignee: Eaton Corporation, Cleveland, Ohio
[21] Appl. No.: 672,544
[22] Filed: Nov. 19, 1984
[51] Int. Cl.$^4$ .............................................. G01L 5/16
[52] U.S. Cl. .................................. 73/862.04; 178/18; 901/33
[58] Field of Search ...................... 73/65, 172, 432 KJ, 73/432 T, 862.04, 862.54, 862.65, 862.67; 178/18; 901/33, 46

[56] References Cited

U.S. PATENT DOCUMENTS

| | | | |
|---|---|---|---|
| 3,492,864 | 2/1970 | Kraeling et al. ................ | 73/862.04 |
| 3,512,595 | 5/1970 | Laimins ....................... | 73/862.65 X |
| 4,121,049 | 10/1978 | Roeber .......................... | 177/211 X |
| 4,355,202 | 10/1982 | DeCosta et al. .................. | 178/18 |
| 4,398,429 | 8/1983 | Cook et al. .................... | 73/862.04 |

Primary Examiner—Charles A. Ruehl
Attorney, Agent, or Firm—C. H. Grace; A. E. Chrow

[57] ABSTRACT

A tactile load sensing transducer for providing a continuous electrical readout indicative of the contact and the location of the load on a load receiving plate substantially simply supported by a plurality of reaction supports on the member. Each reaction support includes a member having a preferably integrally formed connecting portion of reduced transverse section so as to be substantially incapable of resisting moments generated by load plate deflection. Each support preferably has a generally "L" shaped configuration with the preferably integrally formed plate connecting portion formed adjacent the free end of one leg of the "L" so as to create bending strains in the support. Strain gages are provided on each support to sense the bending strains therein and, the gages on each support are connected in a common Wheatstone bridge to provide an indication of the reaction load on the support. A microprocessor circuit means sums the signals from the bridge to provide total load and also computes ratios of the individual support loads to the total to provide separate output signals for the x and y coordinates of the load location on the plate.

12 Claims, 7 Drawing Figures

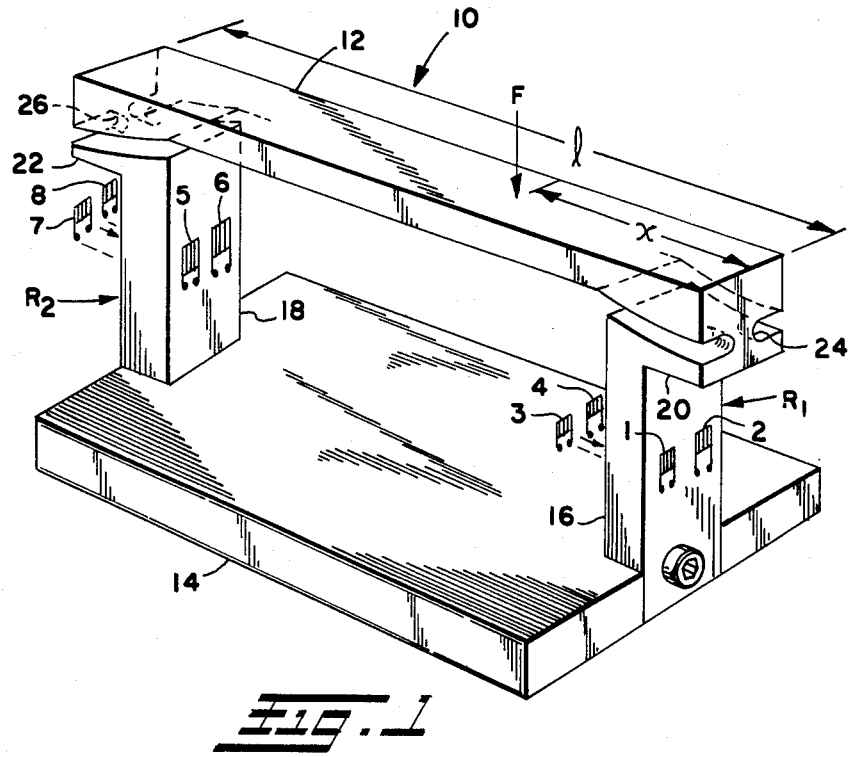
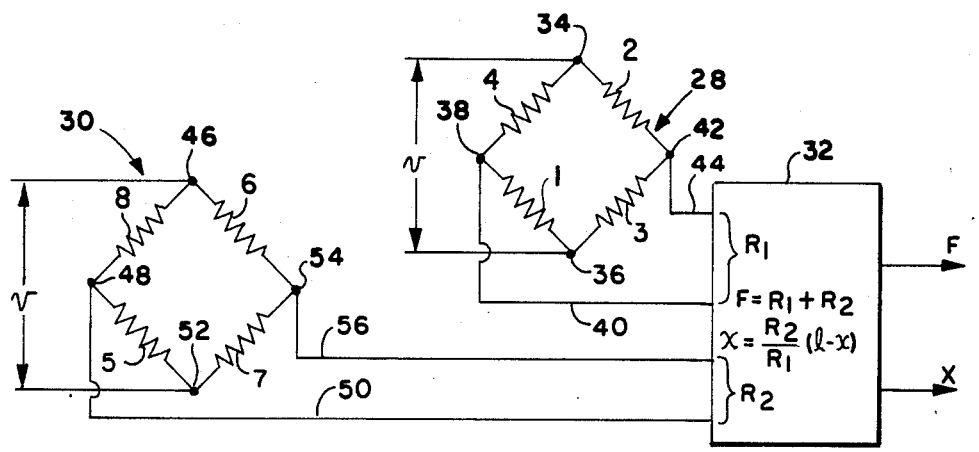

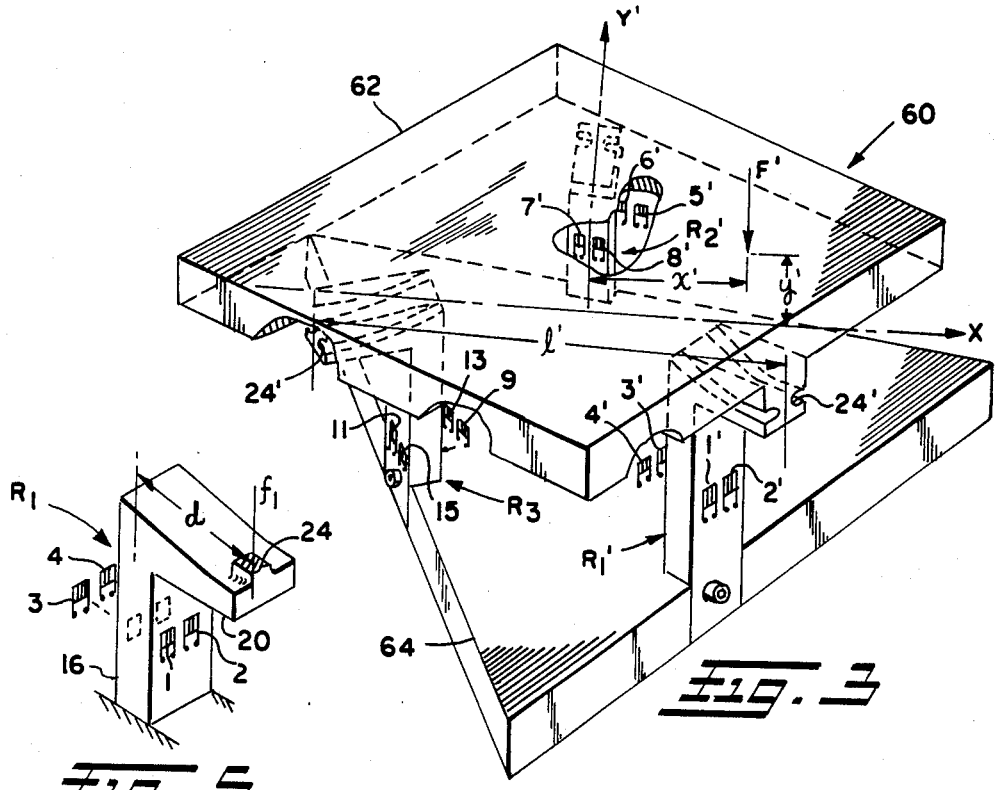
Fig. 3
Fig. 5
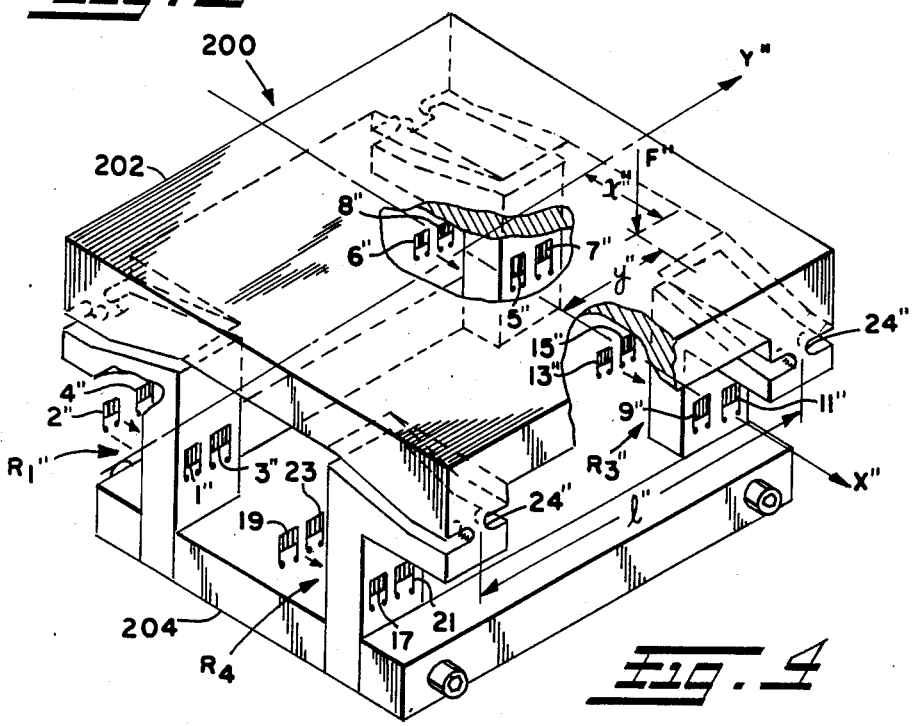
Fig. 4

TACTILE LOAD SENSING TRANSDUCER

BACKGROUND OF THE INVENTION

In utilizing robotic operators for performing industrial manufacturing, assembling and inspection operations for mass production, it has been found necessary to provide the robotic operators with a mechanical sense of touch or feel in order to simulate the dexterity of the human hand. Robotic operators are increasingly being employed in industrial applications such as for positioning components to be welded on an automotive assembly line, for controlling the movement of cutting and forming tools in machining operations and for applying precisely controlled clamping loads to articles of manufacture during various stages of the fabrication. In such industrial applications, the complex motion of the robotic operator is usually controlled by power actuators such as fluid pressure cylinders with flow of fluid thereto controlled by electrically actuated valves receiving control signals from a microprocessor which responds to force and position input feedback signals from sensors provided on the robotic operator. It has been found particularly desirable to provide continuous electrical feedback signals of the position and magnitude of the forces encountered on the members of the robotic operator for input to the program controlling microprocessor.

Heretofore, the technique employed for providing an electrical signal indicative of "touch" or "feel" for a robotic operator has been to provided a tactile load sensor which utilized an array or matrix of discrete touch pad sensors disposed in a predetermined spaced arrangement in the area of the robotic operator making contact with the work article. One such known tactile sensor is of the type employing an elastomeric pad, or touch surface, having a plurality of moveable rods or plungers attached to the underside thereof. Upon tactile contact of the pad with the work article, the imprint of the work article on the pad is mapped by photo detection of the displacement of the rods and mapping of the location of each rod displaced as it is arranged in the matrix. The location of the displaced rod and the displacement thereof may then be summed; and, the displacement integrated to determine the force print of the work article on the tactile sensing pad. In the aforesaid technique, the optical photo detectors thus provide a continuous electrical readout of the movement of each of the plungers or rods. Such devices are limited in tactile sensitivity by the spring constant of the elastomeric pad with respect to each moveable rod and by the minimum obtainable spacing of the rods within the matrix.

Another technique of providing a tactile load sensing transducer is that of providing a grid or array of electrical wires which are initially separated but are displaced to make contact by pressure exerted on a resilient cover pad. The number of junctions pressed into contact thus gives a map of the work article imprint on the tactile sensing pad. If the pad has predetermined known force deformation characteristics, a microprocessor may be employed to compute the disposition and magnitude of the force sensed by the pad. This type of tactile transducer is similarily limited in sensitivity by the number of discrete electrical junctions which may be provided in a given unit area of surface of the tactile sensing pad.

Still another known technique of providing a tactile sensing transducer is that of employing a nonconductive elastomeric pad separated from a layer of conductive material by a fine screen, or grid, of conductive material. Upon a sensed load being applied to the pad, the resistance of the contact of the elastomeric material with the conductive base within each grid is measured. The number of grids over which contact occurs is mapped thereby enabling a computation of the amount and location of the load sensed by the elastomeric pad over the area of the grid.

Presently, it is also known to provide portions of the computational electronics of the microprocessor in the form of large scale integration (LSI) circuitry disposed below the surface of the conductive base or substrate in the aforesaid sensors employing a conductive resilient elastomeric pad disposed over a nonconductive grid. This arrangement has been found convenient and minimizes the number of circuit connections required for external attachment to the matrix or grid array. In such an arrangement, the circuit for each discreet element of a grid array of the LSI is disposed within the boundaries of a grid element and only a minimum number of interconnections with each grid element circuit is required for connection of the array or matrix to the microprocessor.

The aforementioned known techniques for providing a tactile load sensing transducer have the common disadvantage or limitation that the sensitivity is limited by the load bearing capability of the elastomeric pad, and the number of discreet segments or grid sections which can be disposed within a given contact area of the pad. Thus it has long been desired to find a way or means of providing a tactile load sensing transducer which exhibited a high degree of load sensitivity and nearly infinite resolution of the sensed load position. It has further been desired to provide such a tactile load sensor which provides a continuous electrical signal output indicative of the magnitude and position of the load as experienced by the sensor or transducer.

SUMMARY OF THE INVENTION

The present invention provides a unique and novel tactile sensing transducer useful for touch or feel sensing by robotic operators such as the type employed for industrial manufacturing, assembling and checking operations. The present invention provides a tactile load sensing transducer providing a continous electrical output indicative of the magnitude and location of the load experienced by the sensing surface portion of the transducer when contacted by a work article.

The transducer of the present invention employs a sensing member or plate substantially simply supported from a base by a plurality of reaction members. The reaction members are strain gaged, with the gages on each member wired in a Wheatstone bridge circuit to provide an electrical signal indicative of the total load on each reaction member. The signals from each of the reaction member Wheatstone bridge circuits are then summed in a microprocessor to provide the total load experienced by the load plate. The microprocessor circuitry also performs calculations to determined the ratio of the total load experienced by each reaction member and from this computes the distance of the applied load from each reaction member. The present transducer thus provides a continuous readout of the total load and the coordinates for determining the location of the sensed load plate.

The reaction members in the present invention are preferably formed integrally with the load receiving member or plate and are generally "L" shaped in configuration. The reaction members are preferably rigidly mounted to the base means and have a connecting portion thereof disposed adjacent the free end of the leg of the "L" shaped configuration for connecting the support member integrally to the load receiving plate. The integrally formed connecting portion has a reduced transverse section to thereby render the connecting portion substantially incapable of resisting moment loads imposed thereon by bending deflection of the load receiving plate under the urging of the sensed or applied load. Thus, the connecting portions effectively provide the load receiving plate with a plurality of simple supports disposed about the load receiving plate in a desired spaced arrangement.

Each of the "L" shaped reaction members is thus end loaded through the connecting portion and thereby subjected to a bending moment equal to the applied reaction load through the respective connecting portion multiplied by the length of the associated leg of the "L"; and, the bending moment is thus maintained substantially constant in the remaining leg of the "L" shape. Strain gages are provided on the surface of the rigidly mounted base leg of the "L" shaped reaction support and sense bending strain in the support. The arrangement of the strain gages on the support to sense bending strain provides a high degree of strain sensitivity in the strain gages and thus gives the bridge circuit for the particular support a high degree of resolution and sensitivity to the reaction load.

The present invention thus provides a unique and novel tactile load sensing transducer which provides a continuous electrical signal indicative of the magnitude and exact location of the load applied to the sensing plate of the transducer by the work article. The present invention thus enables a single sensing surface to accomodate contact of a robotic operator with the work article and provides heretofore unobtainable load sensitivity and resolution of the applied load location on the transducer sensing surface.

DETAILED DESCRIPTION OF THE DRAWINGS

FIG. 1 is a perspective view of the transducer of the present invention employing a single load sensing member simply supported at the end by two strain gaged reaction supports;

FIG. 2 is a schematic of the Wheatstone bridge and signal processing circuit for the embodiment of FIG. 1;

FIG. 3 is a perspective view of another embodiment of the invention having a load sensing plate simply supported by three reaction supports;

FIG. 4 is a perspective view of another embodiment of the invention employing a load sensing plate simply supported by four reaction supports;

FIG. 5 is an enlarged detail of one of the reaction support members of the embodiments of FIGS. 1, 3 and 4 with a portion broken away to show the reduced section connecting portion;

DETAILED DESCRIPTION

Figure 6:
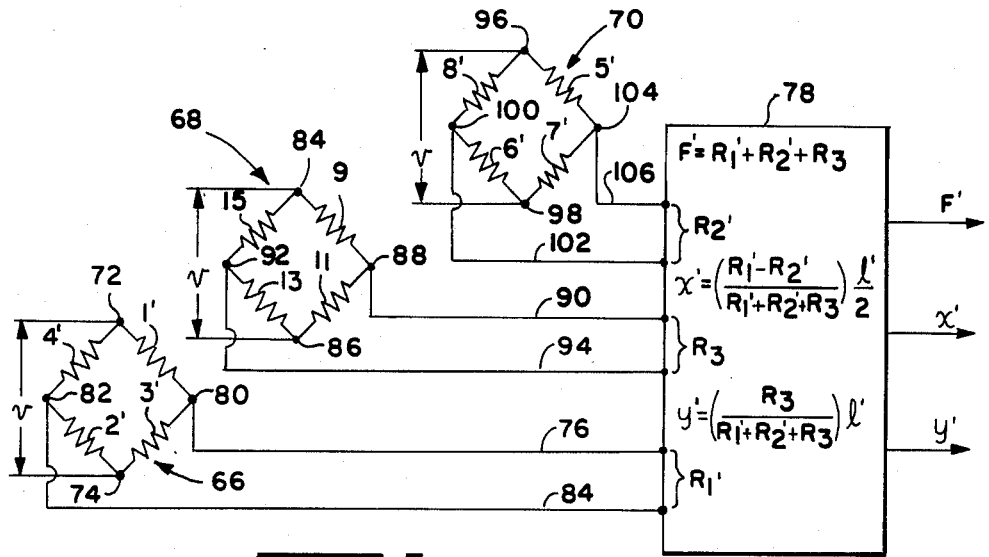
FIG. 6 is a schematic of the Wheatstone bridge circuit and signal processing for the embodiment of FIG. 3; and, FIG. 7 is a schematic of the Wheatstone bridge circuits and the signal processing for the embodiment of FIG. 4.

Referring now to FIG. 1, the tactile load sensing transducer of the present invention is indicated generally at 10 as having a load receiving beam 12 having a length denoted "l" and simply supported at opposite ends thereof by reaction supports indicated generally by referenced characters $R_1$ and $R_2$. the reaction supports $R_1$, $R_2$ are rigidly attached to a suitable base 14. The reaction supports $R_1$, $R_2$ are preferably integrally formed with the beam 12 and configured to provide substantially simple supports, eg., non-moment resistive supports, for the beam at the ends thereof, as will hereinafter be described with greater detail.

In the presently preferred practice of the invention, the reaction supports $R_1$, $R_2$ each comprise a generally "L" shaped member, having one leg thereof rigidly connected at one end thereof to the base plate in a rigid connection as mentioned hereinabove. The rigidly connected legs, denoted respectively 16, 18 in FIG. 1, extend substantially perpendicularly from the base 14 and have the remaining leg of the "L" shaped configuration, denoted respectively 20, 22, extending outwardly therefrom at right angles thereto and parallel to the base 14.

Referring now to FIGS. 1 and 5, the interconnecting portion of the reaction support $R_1$ is shown as a portion which provides the non-moment resistive simple supports for the beam 12, and comprises a reduced transverse section portion denoted 24. In the present practice, the reaction support is formed by machining away portions of the horizontal leg 20, at the under surface of the beam 12. The interconnecting portion 24, is formed to support the beam closely adjacent the end thereof. The vertical reaction load from the beam is thus applied directly to the free end of the horizontal leg 20 of the reaction support for maximizing the bending moment applied thereby to the reaction support $R_1$. Referring to FIG. 5, the portion of the beam load applied to the reaction support $R_1$ is denoted by the reference character $f_1$. The reaction support $R_1$ thus has a moment applied thereto in the amount of $f_1$ multiplied by the length of the horizontal leg 20, denoted by the reference character d in FIG. 5. The applied moment to the reaction support $R_1$ is thus the product $f_1 \times d$.

It will thus be understood, with reference to FIG. 5, that the moment applied to the vertical leg, 16, of the support $R_1$ is constant along the length thereof thus enabling the strain in the support to be magnified by the individual reation load $f_1$ applied to the support $R_1$.

It will be further understood that the illustrated arrangement of the reaction support $R_1$ in FIG. 5 is typical of both supports $R_1$ and $R_2$ and also for the other embodiments illustrated in the drawings and described hereinafter.

With reference to FIGS. 1, 2 and 5, strain gages are applied to each of the support legs 16, 18 and the strain gages on each support are disposed in the legs of a common Wheatstone bridge circuit indicated generally at 28, 30 respectively in FIG. 2. The leg 16 of reaction support $R_1$ has a pair of compression strain gages 1, 2 respectively mounted on the side of the leg 16 subjected to compressive strain and a pair of strain gages 3, 4 mounted on the opposite face of the leg 16 for sensing tensile strain therein. The strain gages 1, 2 are disposed in opposite arms of bridge 28 and gages 3 and 4 are disposed in the remaining opposite arms for averaging the effects of tension and compression strain in the support leg 16.

Reaction support $R_2$ has preferably a pair of strain gages 5, 6 disposed on the side of vertical leg 18 of support $R_2$. Preferably, a pair of strain gages 7, 8 are mounted on the opposite side of leg 18 for sensing compressive strain produced by the bending moment in the vertical leg 18. The strain gages for the leg 18 of support $R_2$ are wired in a Wheatstone bridge indicated at 30 in FIG. 2, with gages 5 and 6 in opposite arms of the bridge and strain gages 7 and 8 disposed in the opposite arms of the bridge for averaging the effect of the tensile and compressive bending strains in the leg 18.

A suitable microprocessor 32 is provided for summing the output signals of bridge circuits 28, 30.

Bridge circuit 28 has one side of the excitation voltage supply line connected to junction 34, with the other side of the supply line connected to an oppositely disposed bridge junction 36. Strain gage 1 is connected between junction 36 and a signal output junction 38 which is connected via lead 40 to one input of the microprocessor. Strain gage 2 is connected in the arm of the bridge between junctions 34 and 42 which is connected via lead 44 to a second input of the microprocessor. Strain gage 4 is connected between junction 34 and signal output junction 38. Strain gage 3 is connected in the arm of the bridge between junction 36 and 42.

Bridge circuit 30 has one lead of the bridge excitation voltage supply line connected to junction 46; and, strain gage 6 is connected between junction 46 and output signal junction 54, which is connected via lead 56 to a third signal input connection of the microprocessor 32. The opposite side of the voltage supply line is connected to junction 52 on the bridge. Strain gage 5, for measuring tensile strains, is connected between junctions 48 and 52; and, strain gage 7 measuring compressive strain is connected between junction 52 and junction 54 of the bridge. Strain gage number 8 measuring compressive strain is connected in the arm of the bridge between junctions 46 and 48 which is connected via lead 50 to a fourth input connection of the microprocessor.

The microprocessor includes suitable circuit logic, well known in the art, to measure the imbalance in the Wheatstone bridge circuit 28 and separately the imbalance in Wheatstone bridge circuit 30 caused by the reaction supports $R_1$, $R_2$ individually experiencing a load, respectively $f_1$, $f_2$ resulting from application of a sensed load "F" as shown in FIG. 1 upon the beam 12 being contacted by the work article. The load "F" may be applied to the beam 12 at any point along the length thereof, and the location of the point of application of load "F" is denoted by the distance "x" in FIG. 1.

It will be understood that the base 14 is adapted for attachment by any suitable means, as for example welding or threaded fasteners to the moveable member of a robotic operator (not shown), such that the beam 12 serves as a tactile sensing element upon contact of the work article, such contact being denoted by the force F in FIG. 1.

Upon application of the tactilely applied load "F", the reaction loads such as $f_1$, for support $R_1$, which is illustrated typically in FIG. 5, create corresponding imbalances in the bridge circuits 28, 30. These imbalances are measured within the microprocessor 32 and electrical signals generated therein indicative of the load and the corresponding value of the reaction loads for $R_1$, $R_2$ are summed to determine the total magnitude of the force F; and a corresponding signal output is provided from the microprocessor indicative of the total force F as shown in FIG. 2.

The microprocessor also performs logic operations to determine the distance x from the bridge imbalance signals in accordance with the following expression:

$$X = \frac{R_2}{R_1}(l - x); \text{ and,}$$

an electrical signal indicative of the computed value of x is provided along a second output line of microprocessor 32 as denoted in FIG. 2.

It will be understood that the signal output for the total force magnitude F and the signal output for the distance x of microprocessor 32 are applied to the inputs of a controller/programmer (not shown) for providing suitable control signals to the robotic operator actuators (not shown). The present invention thus provides a continuous electrical signal output for controlling the movement a robotic operator based upon tactilely sensed contact loads from the transducer 10 when the top of beam 12 thereof makes contact with the work article at any point along the length thereof.

If desired, the microprocessor 32 may be located at a suitable location on or closely adjacent the base 14 to minimize the length of the leads 40, 44, 50 and 56 for the Wheatstone bridge circuits and the corresponding junctions thereof. The exact location of the bridge junctions and the microprocessor 32, however, and the manner of mounting will be determined by the environmental conditions to which the transducer 10 will be subjected and the need for protecting the wire leads to the strain gages and the microprocessor from deleterious effects of the service environment.

Referring now to FIG. 3, another embodiment of the invention is indicated generally at 60 in which a load sensing plate 62 is supported by three reaction supports $R_{1'}$, $R_{2'}$, $R_3$ disposed about a suitable base 64. The reaction supports $R_{1'}$, $R_{2'}$, $R_3$ may be identical to those illustrated in FIG. 5 and the attachment of each to the load plate 62 is preferably integral and comprises a reduced cross section portion similar to that of portion 24 illustrated in FIG. 5.

The reaction supports $R_{1'}$, $R_{2'}$, $R_3$ are rigidly mounted to the base 64 and disposed thereabout in a pattern comprising an equilateral triangle. The reaction supports each have upper horizontal legs corresponding to the leg 20 of FIG. 5 of each support aligned with an altitude of the aforesaid equilateral triangle. The reaction supports $R_{1'}$, $R_{2'}$, $R_3$ thus provide a three point simply supported suspension for the plate 62, which serves as the tactile load sensing surface for the transducer 60.

As described hereinabove with reference to the embodiment 10 of FIG. 2, the base plate 64 is adapted for attachment to a robotic operator (not shown) by any suitable fastening technique.

Each of the reaction supports $R_{1'}$, $R_{2'}$, $R_3$ have, preferably, a plurality of strain gages disposed on the opposite sides thereof for sensing compressive and tensile bending strains in the same manner as set forth hereinable with respect to the typical support $R_1$ shown in FIG. 5. The gages for each reaction support $R_{1'}$, $R_{2'}$, $R_3$ are connected in separate Wheatstone bridge circuits indicated respectively by the general reference characters 66, 68, 70 in FIG. 6.

With reference to FIGS. 3 and 6, the Wheatstone bridge circuit 66 for reaction support $R_1'$ has the strain gages 1', 2' for sensing compressive loads disposed in opposite arms of the bridge and the tensile sensing strain gages 3', 4' disposed oppositely in the remaining arms of the bridge. The bridge circuit 66 is connected to one side of a voltage supply line at junction 72 intermediate strain gages 1', 4'. The remaining side of the voltage supply line is connected to junction 74 intermediate strain gages 2', 3'. A signal output lead 76 connects to one input of microprocessor 78 from bridge output junction 80 intermediate strain gages 1', 3'. The remaining output junction 82 of bridge 66 is connected intermediate strain gages 2', 4' and also through lead 84 to a second input terminal of microprocessor 78. The microprocessor 78 contains suitable circuit logic for providing a signal indicative of the imbalance of bridge 66 in a manner well known in the art for providing a signal indicative of the total load on the reaction support $R_1'$.

With continuing reference to FIG. 6, the bridge circuit 68 for reaction support $R_3$ has one lead of a voltage supply line connected to junction 84 and the opposite lead of the voltage supply line connected to junction 86 on the opposite side of the bridge. Tensile strain gage 9 is connected to bridge junction 84 and junction 88 thus forming one arm of the bridge; and, junction 88 is connected via signal output lead 90 to a third input of microprocessor 78. Bridge junction 84 is also connected through compressive strain gage 15 to bridge junction 92 thereby forming a second arm of the bridge; and, junction 92 is connected via a second signal output lead 94 to a fourth input of microprocessor 78. The remaining compressive strain gage 11 is connected between bridge junctions 88 and 86 to form an arm of the bridge opposite strain gage 15; and strain gage 13, for sensing tensile strain, is connected between bridge junctions 92 and 86 for forming the remaining arm of the bridge 68. The microprocessor 78 thus measures the imbalance of bridge 68 from the signal inputs along lines 94, 90 to provide within the microprocessor an electrical signal indicative of the total load on reaction support $R_3$.

The Wheatstone bridge circuit 70 contains the strain gages for reaction support $R_2'$ and has a junction 96 connected to one side of a voltage supply line. A junction 98 on the opposite side of the bridge is connected to the opposite side of the voltage supply line. Junction 96 is connected also to tensile strain gage 8' which is connected to bridge signal output junction 100 which is also connected through signal output lead 102 to a fifth input of the microprocessor 78. Compressive strain gage 6' is connected between junctions 100 and 98 to form a second arm of the bridge; and tensile strain gage 7' is connected between junction 98 and a second signal output junction 104 to form a third arm of the bridge opposite strain gage 8'. Signal junction 104 is also connected via output lead 106 to a sixth input of microprocessor 78. Strain gage 5' is connected between bridge junctions 96 and 104 thereby forming the fourth arm of the bridge opposite strain gage 6'. The microprocessor is thus operative to generate therein an electrical signal indicative of the total load on reaction support $R_2'$ from the bridge imbalanced sensed from input lines 102, 106.

Referring now to FIG. 3, load sensing plate 62 has received thereon the tactile load F' at any point on the surface of the plate 62. The load F' is located on plate 62 by choosing principal axis Y' comprising an altitude of the equilateral triangle passing through the center of reaction support $R_2'$ and an orthogonal principal axis X' passing through the center of the connecting portions 24' of the reaction supports $R_1'$, $R_3$; and, the distance between such points on the X' axis is denoted by the reference character l' in FIG. 3. Thus, the distance of the sensed load F' from the X' axis is denoted as y'; and, the distance of the load F' from the Y' axis is denoted by the reference character x' in FIG. 3.

The microprocessor 78 is operative to sum the signals from bridge circuits 70, 68, 66 and provide a signal indicative of the total load F' on plate 62 and provide an output signal representative thereof as shown in FIG. 6. The microprocessor is also operative to perform logic operations to determine the distance x' and the distance y' and provide respectively individually electrical signal outputs representative thereof. The logic operation performed by the microprocessor 78 are represented by the following expressions:

$$x' = \frac{(R_1' - R_2')}{(R_1' + R_2' + R_3)} \cdot \frac{xl'}{2};$$

and $$y' = \frac{(R_3)}{(R_1' + R_2' + R_3)} xl'$$

Figure 7:
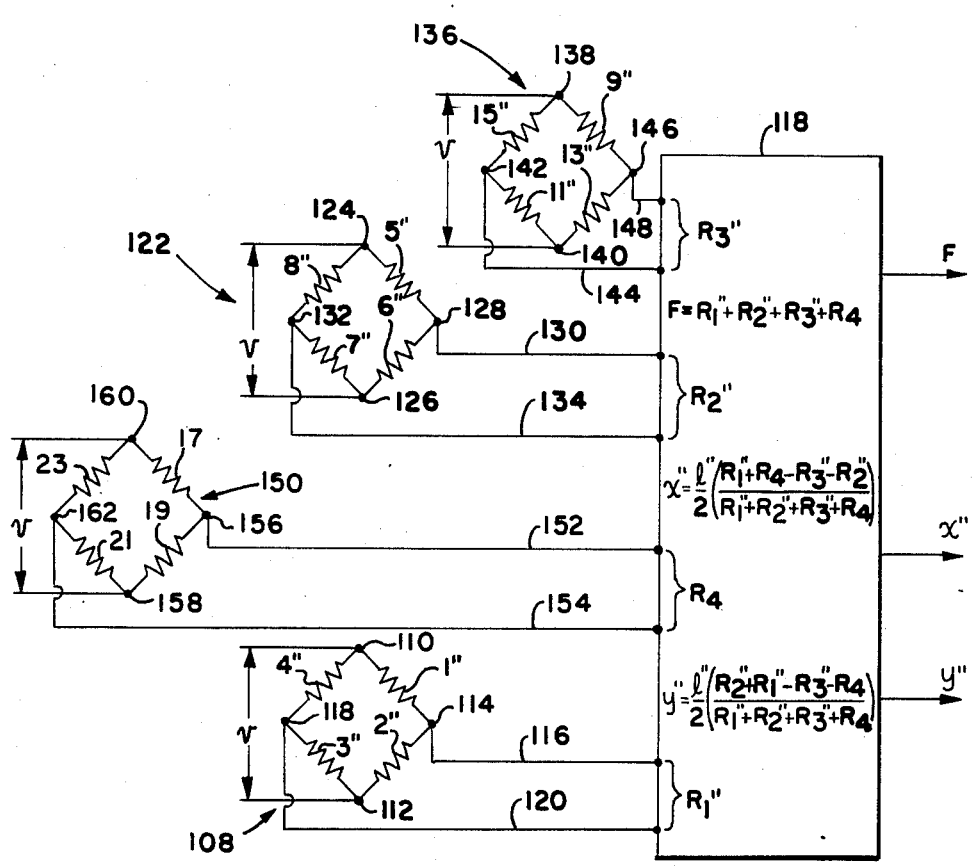

Referring now to FIGS. 4, 5, and 7 another embodiment of the invention is indicated generally at 200 and has a load receiving plate 202 substantially simple supported by a plurality of four equally spaced reaction supports $R_1''$, $R_2''$, $R_3''$, $R_4$ disposed thereabout in preferably equally spaced arrangement to provide a four point simply supported suspension of the plate 202. Each of the reaction supports $R_1''$, $R_2''$, $R_3''$, $R_4$ is rigidly mounted to a base plate 204.

The base plate 204 is adapted for connection to a movable member of a robotic operator (not shown) and the sensing plate 202 is adapted to make contact with a work article for receiving on the surface of plate 202 the tactilely sensed load F''. The load F'' is located on plate 202 by a distance x'' from axis Y'' along the center line of plate 202. A coordinate axis X'' is disposed orthogonally to axis Y'' and the axis X'' is also centrally located on the plate 202. The load F'' is located a distance y'' from the X'' axis as shown in FIG. 4. The principal axes Y'', X'' are disposed to be aligned parallel with the sides of the plate and the distance between the interconnecting portions 24'' of adjacent reaction supports is denoted by the reference character l'' in FIG. 4.

It will be understood that each of the reaction supports $R_1''$, $R_2''$, $R_3''$, $R_4$ for the embodiment of FIG. 4 are structurally identical to the reaction support $R_1$ illustrated in FIG. 5.

Referring now to FIGS. 4 and 7, the reaction support $R_1''$ has tensile strain gages 1'', 3'' disposed on one face thereof and compressive strain gages 2'', 4'' disposed on the side opposite the tensile strain gages. Reaction support $R_2''$ has tensile strain gages 5'', 7'' disposed on the inner face thereof and compressive strain gages 6'', 8'' disposed on the side opposite the tensile strain gages. Reaction support $R_3''$ has compressive strain gages 9'', 11'' disposed on the outer face thereof and tensile strain gages 13'', 15'' disposed on the side opposite the compressive strain gages.

Reaction support $R_4$ has compressive strain gages 17, 21 located on the outer face thereof and tensile strain gages 19, 23 disposed on the side opposite the compressive strain gages.

The strain gages for reaction support $R_1''$ are connected in a Wheatstone bridge circuit indicated generally at 108 which has a junction 110 connected to one side of a voltage supply line and an oppositely disposed junction 112 connected to the remaining side of the voltage supply line. Strain gage 1'' is connected between junctions 110 and 114 and forms one arm of the bridge; and, junction 114 is also connected via lead 116 to one input of a microprocessor 118. Strain gage 4'' is connected between bridge junction 110 and a second signal output junction 118 which is also connected via lead 120 to a second signal input of microprocessor 118. The microprocessor is operative to sense the imbalance of bridge 108 from the input of lines 116, 120 and to provide an electrical signal therein indicative of the load on reaction support $R_1''$. Strain gage 3'' is connected between bridge junctions 118 and 112 and forms an arm of the bridge disposed oppositely from strain gage 1''. Strain gage 2'' is connected between bridge junctions 112 and 114 and forms the fourth arm of the bridge disposed oppositely from strain gage 4''.

A Wheatstone bridge circuit indicated generally at 122 contains the strain gages for reaction support $R_2''$ and has a junction 124 connected to one side of a voltage supply line and an oppositely disposed junction 126 connected to the opposite side of the voltage supply line. Tensile strain gage 5'' is connected between junction 124 and a signal output junction 128 which is also connected via lead 130 to a third input terminal of microprocessor 118. Compressive strain gage 6'' is connected between bridge junctions 128 and 126. Compressive strain gage 8'' is connected between bridge junction 124 and a second signal output junction 132, which is also connected via lead 134 to a fourth input terminal of microprocessor 118. Strain gage 7'' is connected between bridge junctions 132 and 126 to form an arm of the bridge opposite strain gage 5''. The microprocessor is also operative to provide therein an electrical signal indicative of the imbalance of bridge 122 from the inputs along lines 130, 134; and the signal thus provided therein is representative of the load on reaction support $R_2''$.

A third bridge circuit indicated generally at 136 contains the strain gages 9'', 11'', 13'', 15'' for the reaction support $R_3''$. The bridge 136 has a junction 138 connected to one side of the voltage supply line and a second junction 140 oppositely disposed, which is connected to the remaining side of the voltage supply line. Junction 138 is connected to tensile strain gage 15'' which forms one arm of the bridge and connects to signal output junction 142 which is also connected, through lead 144, to a fifth input of the microprocessor 118. Compressive strain gage 11'' is connected between bridge junctions 142 and 140 to form an arm of the bridge. Tensile strain gage 13'' is connected between bridge junction 140 and a second signal output junction 146 forming an arm of the bridge opposite strain gage 15''. Junction 146 is connected via lead 148 to a sixth input of microprocessor 118. Compressive strain gage 9'' is connected between bridge junctions 138 and 146 to form an arm of the bridge oppositely disposed from strain gage 11''. The microprocessor 118 is operative to generate internally therein an electrical signal responsive to the imbalance of bridge 136 along lines 144, 148, which signal is indicative of the load on reaction support $R_3''$.

A Wheatstone bridge circuit indicated generally at 150 is provided for strain gages 17, 19, 21, 23 on reaction support $R_4$. Bridge 150 has signal output lead 152 connected to a seventh input of mircoprocessor 118 and lead 154 connected to an eight input of microprocessor 118. Lead 152 is connected to signal output junction 156 of the bridge and tensile strain gage 19 is connected between junction 156 and junction 158 which is also connected to one side of a voltage supply line. Junction 156 is also connected to compressive strain gage 17 which is connected to a junction 160 connected also to the opposite side of the voltage supply line. Tensile strain gage 23 is connected to junction 160 and also to a second signal output junction 162 which is connected to signal lead 154 such that strain gage 23 forms an arm of the bridge oppositely disposed from strain gage 19. The remaining compressive strain gage 21 is connected between junctions 162 and 158 to form the final arm of the bridge oppositely disposed from strain gage 17.

In operation, the microprocessor 118 is operative to generate internally therein an electrical signal indicative of the imbalance of bridge 150 as sensed by the inputs along line 154, 152.

The microprocessor sums internally the signals for the reaction supports $R_3''$, $R_2''$, $R_4$ and $R_1''$ and provides an output signal indicative of the total load on the plate $F''$.

The microprocessor 118 is also operative by means of internal logic circuitry to generate a separate output signal indicative of the coordinate $x''$ for the load $F''$. The coordinate $x''$ is determined by the expression:

$$x'' = \frac{l''}{2} \times \frac{(R_1'' + R_4 - R_3'' - R_2'')}{(R_1'' + R_2'' + R_3'' + R_4)}$$

The microprocessor 118 is also operative to provide a separate signal output indicative of the coordinate $y''$ in accordance with the expression;

$$y'' = \frac{l''}{2} \times \frac{(R_2'' + R_1'' - R_3'' - R_4)}{(R_1'' + R_2'' + R_3'' + R_4)}$$

The embodiment of FIG. 4 thus provides a tactile load sensing plate suspended by four equally spaced simple supports which provide an output signal indicative of the sensed load $F''$ experienced anywhere on the surface of the load sensing plate. The embodiment of FIG. 4 thus provides a transducer yielding a continuous electrical output signal providing the magnitude and location of the tactilely sensed force upon the transducer contacting a work article.

The present invention thus provides a unique tactile sensing transducer which is capable of providing a continuous electrical signal indicating not only the magnitude of the tactilely sensed contact load but also the coordinates for the location of the load as it is experienced by the tactile sensing surface of the tranducer. Although the invention has hereinabove been described with reference to the illustrated embodiments, it will be understood that the invention is capable of modification and variation and is limited only by the following claims.

I claim:

1. A tactile load sensing transducer comprising:
    (a) a base member having a plurality of load cells mounted thereon in spaced apart relationship;
    (b) a resiliently bendable member substantially simply supported by said load cells disposed at spaced apart margins of said bendable member;

(c) means defining a loading surface on said bendable member at any point intermediate the said load cells;

(d) circuit means operable to sum the signal outputs of said load cells to provide a continuous signal indicative of the total load on said bendable member and including means operable to determine the proportion of the total load on each load cell for providing indication of the location of said load along said bendable member.

2. The transducer defined in claim 1 wherein each of said load cells includes a reaction member and said summing circuit means includes a Wheatstone bridge having both tension and compression measuring strain gages disposed in adjacent arms thereof.

3. The transducer defined in claim 1, wherein each of said local cells includes a post having a generally "L" shaped configuration with a connecting portion attached adjacent the free end of one leg of said "L" shape and extending therefrom, said connecting portion being connected to the adjacent end of said bendable member, said post having strain gages thereon on the leg of said "L" shape remote from said connecting portion, said connecting portion having a relatively small transverse sectional area with respect to the transverse sectional area of said "L" shape and said bendable member, said connecting portion being substantially incapable of resisting moment loads applied thereto thereby rendering said bendable member effectively simply supported.

4. A tactile transducer comprising:
(a) a plate member disposed to receive against one surface thereof a load to be sensed;
(b) at least three reaction supports mounted on a base member and disposed in spaced relationship about said plate on the side thereof opposite said load receiving surface, said plate member being substantially simply supported at each of said supports such that no significant moment is applied to said supports by said plate member when loaded;
(c) strain gage means disposed on each of said supports and operable to provide an electrical signal indicative of the reaction load on each support;
(d) circuit means operable to sum said reaction load signals to provide a continuous signal indicative of the total load on said plate member; said circuit means including means operable to provide the proportion of each reaction load signal with respect to said summed signal and means for indicating the distance of said load from each support thereby locating said load on said plate member.

5. The transducer defined in claim 4, comprising four said reaction supports disposed in equally spaced arrangement about said plate member.

6. The transducer defined in claim 4, wherein each of said supports includes a post having a generally "L" shaped configuration with one leg thereof rigidly mounted on said base member and a connecting portion attached adjacent the free end of the remaining leg of said "L" and extending therefrom, said connecting portions having the transverse section thereof small relative to the transverse section of the legs of said "L", said connecting portions being thereby substantially incapable of resisting any moment load applied thereto by said load receiving plate member, and said strain gage means provided on each of said "L" shaped posts for indicating the load thereon, whereby said plate member is effectively simply supported on each of said posts.

7. A tactile sensing load transducer comprising:
(a) base means;
(b) a load plate adapted to receive on one surface thereof the load to be sensed;
(c) at least three reaction support means connected to said plate adjacent the margins thereof and mounting said plate on said base means, said reaction support means each including a portion of reduced transverse thickness, said portion being substantially incapable of resisting moments applied thereto by said plate, with each of said support means including strain gage means operative to provide an electrical signal indicative of the individual reaction load on each of said reaction support means, said reduced thickness portions each being disposed to create bending strains in said support means;
(d) circuit means operable to sum the signal output of said strain gage means on each of said reaction support means, and including circuit means operable to determine the proportion of plate load on each support means for providing indication of location of said load along said load plate.

8. The transducer defined in claim 7, wherein each of said support means comprises an "L" shaped post having one leg thereof rigidly mounted on said base means with the said reduced section portion formed adjacent the free end of the remaining leg of said "L" shape.

9. The transducer defined in claim 7, wherein said strain gage means comprises electrical resistance means and said circuit means includes a Wheatstone bridge for the strain gage means on each of said support means and means for summing the output of each of said Wheatstone bridges.

10. A tactile load sensing transducer comprising:
(a) a base means;
(b) a load receiving member formed of resiliently deflectable material and having a generally elongated configuration;
(c) a plurality of reaction support members disposed on said base means in spaced relationship and each including structure connecting with said load receiving member adjacent a margin thereof and spaced in the direction of elongation, each connecting structure being substantially incapable of resisting moment loads applied thereto by loading of said load receiving member thereby rendering said load receiving member effectively simply supported;
whereupon loading of said load receiving member said connecting structure becomes operative to cause bending strain in said reaction support members;
(d) strain gage means operative to sense bending strain in said support members;
(e) first circuit means operable to continuously sum the signal outputs of said strain gage means and provide a continuous indication of the total load applied to said load receiving member; and
second circuit means operable to determine the proportion of load on each reaction support member to total load and thereby determine the distance of said applied load from any of said reaction support members.

11. The transducer defined in claim 10, wherein said load receiving member, said connecting structure and said plurality of reaction support members are formed integrally.

12. The transducer defined in claim 10, wherein said reaction support members are each rigidly mounted to said base means and said connecting structure comprises integral portions of said support members having a reduced transverse section for rendering said structure incapable of resisting moments.

* * * * *